US009330324B2

(12) United States Patent
Cohen et al.

(10) Patent No.: US 9,330,324 B2
(45) Date of Patent: May 3, 2016

(54) ERROR COMPENSATION IN THREE-DIMENSIONAL MAPPING

(75) Inventors: Daniel Cohen, Tel-Aviv (IL); Dmitri Rais, Ramat-Gan (IL); Erez Sali, Savion (IL); Niv Galezer, Tel-Aviv (IL); Alexander Shpunt, Tel-Aviv (IL)

(73) Assignee: APPLE INC., Cupertino, CA (US)

( * ) Notice: Subject to any disclaimer, the term of this patent is extended or adjusted under 35 U.S.C. 154(b) by 697 days.

(21) Appl. No.: 13/541,775

(22) Filed: Jul. 5, 2012

(65) Prior Publication Data

US 2012/0281240 A1 Nov. 8, 2012

Related U.S. Application Data

(63) Continuation-in-part of application No. 12/605,340, filed on Oct. 25, 2009, now abandoned, and a continuation-in-part of application No. 12/282,517, filed as application No. PCT/IL2007/000306 on Mar.

(Continued)

(51) Int. Cl.
*H04N 5/228* (2006.01)
*G01B 11/30* (2006.01)
(Continued)

(52) U.S. Cl.
CPC ............ *G06K 9/2036* (2013.01); *G06T 7/0057* (2013.01); *H04N 13/0253* (2013.01); *H04N 13/0271* (2013.01); *G06K 2209/40* (2013.01); *G06T 2207/30196* (2013.01)

(58) Field of Classification Search
CPC ................... G06T 2207/10028; G06T 7/0004; G06T 7/0057; G06T 2207/30196; H04N 9/3194; H04N 13/0253; H04N 13/0271; B41F 27/005; G06K 9/2036; G06K 2209/40

USPC ........................ 348/222.1, 335; 382/275, 285
See application file for complete search history.

(56) References Cited

U.S. PATENT DOCUMENTS 4,542,376 A 9/1985 Bass et al.
4,802,759 A 2/1989 Matsumoto
(Continued)

FOREIGN PATENT DOCUMENTS

DE 19736169 A1 8/1997
DE 19638727 A1 3/1998
(Continued)

OTHER PUBLICATIONS

U.S. Appl. No. 12/844,864 Office Action dated Sep. 26, 2013.
(Continued)

*Primary Examiner* — Antoinette Spinks
*Assistant Examiner* — Carramah J Quiett
(74) *Attorney, Agent, or Firm* — D. Kligler IP Services Ltd.

(57) ABSTRACT

A method for forming a three-dimensional (3D) map of an object, including illuminating the object from a light source so as to project a pattern onto the object, capturing an image of the pattern using an array of detector elements, and processing the captured image so as to measure respective offsets of elements of the pattern in the captured image relative to a reference pattern, the offsets including at least a first offset of a first element of the pattern and a second offset of a second element of the pattern, measured respectively in first and second, mutually-perpendicular directions in a plane of the array. The method further includes computing a correction factor in response to the first offset, applying the correction factor to the second offset so as to find a corrected offset, and computing depth coordinates of the object in response to the corrected offset.

36 Claims, 5 Drawing Sheets

Related U.S. Application Data 8, 2007, now Pat. No. 8,390,821, said application No. 12/282,517 is a continuation-in-part of application No. PCT/IL2006/000335, filed on Mar. 14, 2006.

(60) Provisional application No. 60/785,187, filed on Mar. 24, 2006, provisional application No. 60/724,903, filed on Oct. 11, 2005.

(51) Int. Cl.
*G06K 9/20* (2006.01)
*G06T 7/00* (2006.01)
*H04N 13/02* (2006.01)

(56) References Cited

U.S. PATENT DOCUMENTS

| | | | |
|---|---|---|---|
| 4,843,568 A | 6/1989 | Krueger et al. | |
| 5,075,562 A | 12/1991 | Greivenkamp et al. | |
| 5,483,261 A | 1/1996 | Yasutake | |
| 5,630,043 A | 5/1997 | Uhlin | |
| 5,636,025 A | 6/1997 | Bieman et al. | |
| 5,712,682 A | 1/1998 | Hannah | |
| 5,835,218 A | 11/1998 | Harding | |
| 5,838,428 A | 11/1998 | Pipitone et al. | |
| 5,856,871 A | 1/1999 | Cabib et al. | |
| 5,909,312 A | 6/1999 | Mendlovic et al. | |
| 6,084,712 A | 7/2000 | Harding | |
| 6,088,105 A | 7/2000 | Link | |
| 6,099,134 A | 8/2000 | Taniguchi et al. | |
| 6,100,517 A | 8/2000 | Yahav et al. | |
| 6,101,269 A | 8/2000 | Hunter et al. | |
| 6,108,036 A | 8/2000 | Harada et al. | |
| 6,167,151 A | 12/2000 | Albeck | |
| 6,259,561 B1 | 7/2001 | George et al. | |
| 6,262,740 B1 | 7/2001 | Lauer et al. | |
| 6,268,923 B1 | 7/2001 | Michniewicz et al. | |
| 6,301,059 B1 | 10/2001 | Huang et al. | |
| 6,377,700 B1 | 4/2002 | Mack et al. | |
| 6,438,263 B2 | 8/2002 | Albeck et al. | |
| 6,438,272 B1 * | 8/2002 | Huang et al. | 382/286 |
| 6,686,921 B1 | 2/2004 | Rushmeier et al. | |
| 6,700,669 B1 | 3/2004 | Geng | |
| 6,731,391 B1 | 5/2004 | Kao et al. | |
| 6,741,251 B2 | 5/2004 | Malzbender | |
| 6,750,906 B1 | 6/2004 | Itani et al. | |
| 6,751,344 B1 | 6/2004 | Grumbine | |
| 6,754,370 B1 | 6/2004 | Hall-Holt et al. | |
| 6,759,646 B1 | 7/2004 | Acharya et al. | |
| 6,803,777 B2 | 10/2004 | Pfaff et al. | |
| 6,810,135 B1 | 10/2004 | Berenz et al. | |
| 6,813,440 B1 | 11/2004 | Yu et al. | |
| 6,825,985 B2 | 11/2004 | Brown et al. | |
| 6,841,780 B2 | 1/2005 | Cofer et al. | |
| 6,859,326 B2 | 2/2005 | Sales | |
| 6,937,348 B2 | 8/2005 | Geng | |
| 7,009,742 B2 | 3/2006 | Brotherton-Ratcliffe et al. | |
| 7,013,040 B2 | 3/2006 | Shiratani | |
| 7,076,024 B2 | 7/2006 | Yokhin | |
| 7,112,774 B2 | 9/2006 | Baer | |
| 7,120,228 B2 | 10/2006 | Yokhin et al. | |
| 7,127,101 B2 | 10/2006 | Littlefield et al. | |
| 7,194,105 B2 | 3/2007 | Hersch et al. | |
| 7,231,069 B2 | 6/2007 | Nahata | |
| 7,256,899 B1 | 8/2007 | Faul et al. | |
| 7,335,898 B2 | 2/2008 | Donders et al. | |
| 7,369,685 B2 | 5/2008 | DeLean | |
| 7,385,708 B2 | 6/2008 | Ackerman et al. | |
| 7,433,024 B2 | 10/2008 | Garcia et al. | |
| 7,551,719 B2 | 6/2009 | Yokhin et al. | |
| 7,560,679 B1 | 7/2009 | Gutierrez | |
| 7,700,904 B2 | 4/2010 | Toyoda et al. | |
| 7,811,825 B2 | 10/2010 | Fauver et al. | |
| 7,952,781 B2 | 5/2011 | Weiss et al. | |
| 8,018,579 B1 | 9/2011 | Krah | |
| 8,035,806 B2 | 10/2011 | Jin et al. | |
| 8,126,261 B2 | 2/2012 | Medioni et al. | |
| 8,326,025 B2 | 12/2012 | Boughorbel | |
| 2001/0012156 A1 | 8/2001 | Leigh-Jones et al. | |
| 2002/0075456 A1 | 6/2002 | Shiratani | |
| 2003/0048237 A1 | 3/2003 | Sato et al. | |
| 2003/0057972 A1 | 3/2003 | Pfaff et al. | |
| 2003/0156756 A1 | 8/2003 | Gokturk et al. | |
| 2004/0001145 A1 | 1/2004 | Abbate | |
| 2004/0063235 A1 | 4/2004 | Chang | |
| 2004/0105580 A1 | 6/2004 | Hager et al. | |
| 2004/0130730 A1 | 7/2004 | Cantin et al. | |
| 2004/0130790 A1 | 7/2004 | Sales | |
| 2004/0174770 A1 | 9/2004 | Rees | |
| 2004/0213463 A1 | 10/2004 | Morrison | |
| 2004/0218262 A1 | 11/2004 | Chuang et al. | |
| 2004/0228519 A1 | 11/2004 | Littlefield et al. | |
| 2004/0264764 A1 | 12/2004 | Kochi et al. | |
| 2005/0018209 A1 | 1/2005 | Lemelin et al. | |
| 2005/0052637 A1 | 3/2005 | Shaw et al. | |
| 2005/0111705 A1 | 5/2005 | Waupotitsch et al. | |
| 2005/0134582 A1 | 6/2005 | Hermann Claus et al. | |
| 2005/0135555 A1 | 6/2005 | Claus et al. | |
| 2005/0200838 A1 | 9/2005 | Shaw et al. | |
| 2005/0200925 A1 | 9/2005 | Brotherton-Ratcliffe et al. | |
| 2005/0271279 A1 | 12/2005 | Fujimura et al. | |
| 2006/0017656 A1 | 1/2006 | Miyahara | |
| 2006/0072851 A1 | 4/2006 | Kang et al. | |
| 2006/0156756 A1 | 7/2006 | Becke | |
| 2006/0221218 A1 | 10/2006 | Adler et al. | |
| 2006/0221250 A1 | 10/2006 | Rossbach et al. | |
| 2006/0269896 A1 | 11/2006 | Liu et al. | |
| 2007/0057946 A1 | 3/2007 | Albeck et al. | |
| 2007/0060336 A1 | 3/2007 | Marks et al. | |
| 2007/0133840 A1 | 6/2007 | Cilia | |
| 2007/0262985 A1 | 11/2007 | Watanabe et al. | |
| 2008/0018595 A1 | 1/2008 | Hildreth et al. | |
| 2008/0037829 A1 | 2/2008 | Givon | |
| 2008/0106746 A1 | 5/2008 | Shpunt et al. | |
| 2008/0118143 A1 | 5/2008 | Gordon et al. | |
| 2008/0198355 A1 | 8/2008 | Domenicali et al. | |
| 2008/0212835 A1 | 9/2008 | Tavor | |
| 2008/0240502 A1 | 10/2008 | Freedman et al. | |
| 2008/0247670 A1 | 10/2008 | Tam et al. | |
| 2008/0278572 A1 | 11/2008 | Gharib et al. | |
| 2008/0285827 A1 | 11/2008 | Meyer et al. | |
| 2009/0046152 A1 | 2/2009 | Aman | |
| 2009/0060307 A1 | 3/2009 | Ghanem et al. | |
| 2009/0096783 A1 | 4/2009 | Shpunt et al. | |
| 2009/0183125 A1 | 7/2009 | Magal et al. | |
| 2009/0183152 A1 | 7/2009 | Yang et al. | |
| 2009/0185274 A1 | 7/2009 | Shpunt | |
| 2009/0226079 A1 | 9/2009 | Katz et al. | |
| 2009/0244309 A1 | 10/2009 | Maison et al. | |
| 2010/0007717 A1 | 1/2010 | Spektor et al. | |
| 2010/0013860 A1 | 1/2010 | Mandella et al. | |
| 2010/0020078 A1 | 1/2010 | Shpunt | |
| 2010/0118123 A1 | 5/2010 | Freedman et al. | |
| 2010/0142014 A1 | 6/2010 | Rosen et al. | |
| 2010/0177164 A1 | 7/2010 | Zalevsky et al. | |
| 2010/0182406 A1 | 7/2010 | Benitez | |
| 2010/0201811 A1 | 8/2010 | Garcia et al. | |
| 2010/0225746 A1 | 9/2010 | Shpunt et al. | |
| 2010/0243899 A1 | 9/2010 | Ovsiannikov et al. | |
| 2010/0245826 A1 | 9/2010 | Lee | |
| 2010/0265316 A1 | 10/2010 | Sali et al. | |
| 2010/0278384 A1 | 11/2010 | Shotton et al. | |
| 2010/0284082 A1 | 11/2010 | Shpunt et al. | |
| 2010/0290698 A1 | 11/2010 | Shpunt et al. | |
| 2010/0303289 A1 | 12/2010 | Polzin et al. | |
| 2011/0001799 A1 | 1/2011 | Rothenberger et al. | |
| 2011/0025827 A1 | 2/2011 | Shpunt et al. | |
| 2011/0043403 A1 | 2/2011 | Loffler | |
| 2011/0074932 A1 | 3/2011 | Gharib et al. | |
| 2011/0096182 A1 | 4/2011 | Cohen et al. | |
| 2011/0134114 A1 | 6/2011 | Rais et al. | |
| 2011/0158508 A1 | 6/2011 | Shpunt et al. | |
| 2011/0187878 A1 | 8/2011 | Mor et al. | |
| 2011/0188054 A1 | 8/2011 | Mor et al. | |

(56) References Cited

U.S. PATENT DOCUMENTS

| | | | |
|---|---|---|---|
| 2011/0211044 | A1 | 9/2011 | Shpunt et al. |
| 2011/0279648 | A1 | 11/2011 | Lutian et al. |
| 2011/0285910 | A1 | 11/2011 | Bamji et al. |
| 2011/0310125 | A1 | 12/2011 | McEldowney et al. |
| 2012/0012899 | A1 | 1/2012 | Jin et al. |
| 2012/0051588 | A1 | 3/2012 | McEldowney |
| 2012/0140109 | A1 | 6/2012 | Shpunt et al. |

FOREIGN PATENT DOCUMENTS

| | | | |
|---|---|---|---|
| GB | 2352901 | A | 2/2001 |
| JP | 62206684 | A | 9/1987 |
| JP | 03-029806 | U | 2/1991 |
| JP | H03-040591 | A | 2/1991 |
| JP | H08-186845 | A | 7/1996 |
| JP | H10-327433 | A | 12/1998 |
| JP | 2000131040 | A | 5/2000 |
| JP | 2002-152776 | A | 5/2002 |
| JP | 2002-213931 | A | 7/2002 |
| JP | 2002-365023 | A | 12/2002 |
| JP | 2006-128818 | A | 5/2006 |
| WO | 9303579 | A1 | 2/1993 |
| WO | 9827514 | A2 | 6/1998 |
| WO | 9828593 | A1 | 7/1998 |
| WO | 2005010825 | A2 | 2/2005 |
| WO | WO 2007105205 | A2 * | 9/2007 |

OTHER PUBLICATIONS

U.S. Appl. No. 13/921,224 Office Action dated Oct. 3, 2013.
U.S. Appl. No. 12/958,427 Office Action dated Nov. 22, 2013.
Hart, D., U.S. Appl. No. 09/616,606 "Method and System for High Resolution , Ultra Fast 3-D Imaging," filed Jul. 14, 2000.
International Application PCT/IL2007/000306 Search Report dated Oct. 2, 2008.
International Application PCT/IL20027/000262 Search Report dated Oct. 16, 2008.
International Application PCT/IL2008/000458 Search Report dated Oct. 28, 2008.
International Application PCT/IL2008/000327 Search Report dated Sep. 26, 2008.
International Application PCT/IL2006/000335 Preliminary Report on Patentability dated Apr. 24, 2008.
Sazbon et al., "Qualitative real-time range extraction for preplanned scene partitioning using laser beam coding", Pattern Recognition Letters 26, pp. 1772-1781, year 2005.
Sjodahl et al., "Measurement of shape by using projected random and patterns and temporal digital speckle photography", Applied Optics, vol. 38, No. 10, Apr. 1, 1999.
Garcia et al., "Three dimensional mapping and range measurement by means of projected speckle patterns", Applied Optics, vol. 47, No. 16, Jun. 1, 2008.
Chen et al., "Measuring of a Three-Dimensional Surface by Use of a Spatial Distance Computation", Applied Optics, vol. 42, issue 11, pp. 1958-1972, Apr. 10, 2003.
Ypsilos et al., "Speech-driven Face Synthesis from 3D Video", 2nd International Symposium on 3D Processing, Visualization and Transmission, Thessaloniki, Greece, Sep. 6-9, 2004.
Hanson et al., "Optics and Fluid Dynamics Department", Annual Progress Report for 1997 (an abstract).
Ypsilos et al., "Video-rate capture of Dynamic Face Shape and Appearance", Sixth IEEE International Conference on Automatic Face and Gesture Recognition (FGR 2004), Seoul, Korea, May 17-19, 2004.
Goodman, J.W., "Statistical Properties of Laser Speckle Patterns", Laser Speckle and Related Phenomena, pp. 9-75, Springer-Verlag, Berlin Heidelberg, 1975.
Dainty, J.C., "Introduction", Laser Speckle and Related Phenomena, pp. 1-7, Springer-Verlag, Berlin Heidelberg, 1975.

Avidan et al., "Trajectory triangulation: 3D reconstruction of moving points from amonocular image sequence", IEEE Transactions on Pattern Analysis and Machine Intelligence, vol. 22, No. 4, pages, Apr. 2000.
Leclerc et al., "The direct computation of height from shading", Proceedings of Computer Vision and Pattern Recognition, pp. 552-558, year 1991.
Zhang et al., "Height recovery from intensity gradients", Proceedings of IEEE Computer Society Conference on Computer Vision and Pattern Recognition, pp. 508-513, year 1994.
Zigelman et al., "Texture mapping using surface flattening via multi-dimensional scaling", IEEE Transactions on Visualization and Computer Graphics, 8 (2), pp. 198-207, year 2002.
Kimmel et al., Analyzing and synthesizing images by evolving curves with the Osher-Sethian method, International Journal of Computer Vision, 24(1), pp. 37-56 , year 1997.
Koninckx et al., "Efficient, Active 3D Acquisition, based on a Pattern-Specific Snake", Luc Van Gool (Editor), (DAGM 2002) Pattern Recognition, Lecture Notes in Computer Science 2449, pp. 557-565, Springer 2002.
Horn, B., "Height and gradient from shading", International Journal of Computer Vision, No. 5, pp. 37-76, year 1990.
Bruckstein, A., "On shape from shading", Computer Vision, Graphics, and Image Processing, vol. 44, pp. 139-154, year 1988.
Zhang et al., "Rapid Shape Acquisition Using Color Structured Light and Multi-Pass Dynamic Programming", 1st International Symposium on 3D Data Processing Visualization and Transmission (3DPVT), Padova, Italy, Jul. 2002.
Besl, P., "Active Optical Range Imaging Sensors", Machine Vision and Applications, No. 1, pp. 127-152, USA 1988.
Horn et al., "Toward optimal structured light patterns", Proceedings of International Conference on Recent Advances in 3D Digital Imaging and Modeling, pp. 28-37, Ottawa, Canada, May 1997.
Mendlovic, et al., "Composite harmonic filters for scale, projection and shift invariant pattern recognition", Applied Optics, vol. 34, No. 2, pp. 310-316, Jan. 10, 1995.
Asada et al., "Determining Surface Orientation by Projecting a Stripe Pattern", IEEE Transactions on Pattern Analysis and Machine Intelligence, vol. 10, No. 5, year 1988.
Winkelbach et al., "Shape from Single Stripe Pattern Illumination", Luc Van Gool (Editor), (DAGM 2002) Patter Recognition, Lecture Notes in Computer Science 2449, p. 240-247, Springer 2002.
EZconn Czech A.S., "Site Presentation", Oct. 2009.
Zhu et al., "Fusion of Time-of-Flight Depth and Stereo for High Accuracy Depth Maps", Proceedings of the IEEE Conference on Computer Vision and Pattern Recognition, Anchorage, USA, Jun. 24-26, 2008.
Luxtera Inc., "Luxtera Announces World's First 10GBit CMOS Photonics Platform", Carlsbad, USA, Mar. 28, 2005 (press release).
Lee et al., "Variable Pulse Mode Driving IR Source Based 3D Robotic Camera", MVA2005 IAPR Conference on Machine Vision Applications, pp. 530-533, Japan, May 16-18, 2005.
Mordohai et al., "Tensor Voting: A Perceptual Organization Approach to Computer Vision and Machine Learning", Synthesis Lectures on Image, Video and Multimedia Processing, issue No. 8, Publishers Morgan and Claypool, year 2006.
Beraldin et al., "Active 3D Sensing", Scuola Normale Superiore Pisa, vol. 10, pp. 22-46, Apr. 2000.
Bhat et al., "Ordinal Measures for Image Correspondence", IEEE Transactions on Pattern Analysis and Machine Intelligence, vol. 20, No. 4, pp. 415-423, Apr. 1998.
Bradley et al., "Synchronization and Rolling Shutter Compensation for Consumer Video Camera Arrays", IEEE International Workshop on Projector-Camera Systems—PROCAMS 2009 (Miami Beach, Florida, 2009).
De Piero et al., "3D Computer Vision Using Structured Light: Design Calibration and Implementation Issues", Advances in Computers, vol. 43, pp. 243-278, Academic Press 1996.
Hongjun et al., "Shape Measurement by Digital Speckle Temporal Sequence Correlation Method", Acta Optica Sinica Journal, vol. 21, No. 10, pp. 1208-1213, Oct. 2001 (with English abstract).
Hongjun, D., "Digital Speckle Temporal Sequence Correlation Method and the Application in Three-Dimensional Shape Measure- (56) References Cited

OTHER PUBLICATIONS ment", Chinese Doctoral Dissertations & Master's Theses, Full-text Database (Master) Basic Sciences, No. 1, Mar. 15, 2004.
Hsueh et al., "Real-time 3D Topography by Speckle Image Correlation", Proceedings of SPIE Conference on Input/Output and Imaging Technologies, vol. 3422, pp. 108-112, Taiwan, Jul. 1998.
Chinese Patent Application # 200780009053.8 Official Action dated Apr. 15, 2010 (English translation).
Chinese Patent Application # 200680038004.2 Official Action dated Mar. 30, 2010 (English translation).
Chinese Patent Application # 200680038004.2 Official Action dated Aug. 3, 2011 (English translation).
Engfield, N., "Use of Pseudorandom Encoded Grid in U.S. Appl. No. 11/899,542", Andrews Robichaud, Jun. 22, 2011.
Korean Patent Application # 10-2008-7025030 Office Action dated Feb. 25, 2013.
U.S. Appl. No. 12/707,678 Office Action dated Feb. 26, 2013.
U.S. Appl. No. 12/758,047 Office Action dated Apr. 25, 2013.
U.S. Appl. No. 12/844,864 Office Action dated Apr. 11, 2013.
U.S. Appl. No. 12/522,171 Official Action dated Apr. 5, 2012.
U.S. Appl. No. 12/397,362 Official Action dated Apr. 24, 2012.
International Application PCT/IB2011/053560 Search Report dated Jan. 19, 2012.
International Application PCT/IB2011/055155 Search Report dated Apr. 20, 2012.
U.S. Appl. No. 13/311,589, filed Dec. 6, 2011.
U.S. Appl. No. 12/522,176 Official Action dated Aug. 2, 2012.
U.S. Appl. No. 61/598,921, filed Feb. 15, 2012.
Richardson, W. H., "Bayesian-Based Iterative Method of Image Restoration", Journal of the Optical Society of America, vol. 62, No. 1, pp. 55-59, Jan. 1972.
Omnivision Technologies Inc., "OV2710 1080p/720p HD Color CMOS Image Sensor with OmniPixel3-HS Technology", Dec. 2011.
U.S. Appl. No. 13/437,977, filed Apr. 3, 2012.
U.S. Appl. No. 12/282,517 Official Action dated Jun. 12, 2012.
U.S. Appl. No. 12/522,172 Official Action dated Jun. 29, 2012.
U.S. Appl. No. 12/703,794 Official Action dated Aug. 7, 2012.
JP Patent Application # 2008558984 Office Action dated Jul. 3, 2012.
Japanese Patent Application # 2011-517308 Official Action dated Dec. 5, 2012.
U.S. Appl. No. 12/844,864 Official Action dated Dec. 6, 2012.
U.S. Appl. No. 12/758,047 Official Action dated Oct. 25, 2012.
U.S. Appl. No. 13/036,023 Official Action dated Jan. 7, 2013.
Abramson, N., "Holographic Contouring by Translation", Applied Optics Journal, vol. 15, No. 4, pp. 1018-1976, Apr. 1976.
Achan et al., "Phase Unwrapping by Minimizing Kikuchi Free Energy", IEEE International Geoscience and Remote Sensing Symposium, pp. 1738-1740, Toronto, Canada, Jun. 2002.
Theocaris et al., "Radial Gratings as Moire Gauges", Journal of Scientific Instruments (Journal of Physics E), series 2, vol. 1, year 1968.
International Application PCT/IB2011/053560 "Scanning Projectors and Image Capture Modules for 3D Mapping" filed on Aug. 10, 2011.
International Application PCT/IL2009/000285 Search Report dated Jun. 11, 2009.
Brooks et al., "Moire Gauging Using Optical Interference Patterns", Applied Optics Journal, vol. 8, No. 5, pp. 935-940, May 1969.
Hovanesian et al., "Moire Contour-Sum Contour-Difference, and Vibration Analysis of Arbitrary Objects", Applied Optics Journal, vol. 10, No. 12, pp. 2734-2738, Dec. 1971.
Bryngdahl, O., "Characteristics of Superposed Patterns in Optics", Journal of Optical Society of America, vol. 66, No. 2, pp. 87-94, Feb. 1976.
International Application PCT/IL2008/000095 Search Report dated Jul. 24, 2008.
Chen et al., "Overview of Three-Dimensional Shape Measurement Using Optical Methods", Society of Photo-Optical Instrumentation Engineers Journal 39(1), pp. 10-22, Jan. 2000.

Cohen et al., "High-Resolution X-ray Diffraction for Characterization and Monitoring of Silicon-On-Insulator Fabrication Processes", Applied Physics Journal, vol. 93, No. 1, pp. 245-250, Jan. 2003.
Zhang et al., "Shape from intensity gradient", IEEE Transactions on Systems, Man and Cybernetics—Part A: Systems and Humans, vol. 29, No. 3, pp. 318-325, May 1999.
Doty, J.L., "Projection Moire for Remote Contour Analysis", Journal of Optical Society of America, vol. 73, No. 3, pp. 366-372, Mar. 1983.
Ben Eliezer et al., "Experimental Realization of an Imaging System with an Extended Depth of Field", Applied Optics Journal, vol. 44, No. 14, pp. 2792-2798, May 10, 2005.
Tay et al., "Grating Projection System for Surface Contour Measurement", Applied Optics Journal, vol. 44, No. 8, pp. 1393-1400, Mar. 10, 2005.
Takeda et al., "Fourier Transform Methods of Fringe-Pattern Analysis for Computer-Based Topography and Interferometry", Journal of Optical Society of America, vol. 72, No. 1, Jan. 1982.
Takasaki, H., "Moire Topography", Applied Optics Journal, vol. 12, No. 4, pp. 845-850, Apr. 1973.
Takasaki, H., "Moire Topography", Applied Optics Journal, vol. 9, No. 6, pp. 1467-1472, Jun. 1970.
Hildebrand et al., "Multiple-Wavelength and Multiple-Source Holography Applied to Contour Generation", Journal of Optical Society of America Journal, vol. 57, No. 2, pp. 155-162, Feb. 1967.
Su et al., "Application of Modulation Measurement Profilometry to Objects with Surface Holes", Applied Optics Journal, vol. 38, No. 7, pp. 1153-1158, Mar. 1, 1999.
Btendo, "Two Uni-axial Scanning Mirrors Vs One Bi-axial Scanning Mirror", Kfar Saba, Israel, Aug. 13, 2008.
Hung et al., "Time-Averaged Shadow-Moire Method for Studying Vibrations", Applied Optics Journal, vol. 16, No. 6, pp. 1717-1719, Jun. 1977.
Idesawa et al., "Scanning Moire Method and Automatic Measurement of 3-D Shapes", Applied Optics Journal, vol. 16, No. 8, pp. 2152-2162, Aug. 1977.
Iizuka, K., "Divergence-Ratio Axi-Vision Camera (Divcam): A Distance Mapping Camera", Review of Scientific Instruments 77, 0451111 (2006).
Lim et al., "Additive Type Moire with Computer Image Processing", Applied Optics Journal, vol. 28, No. 13, pp. 2677-2680, Jul. 1, 1989.
Piestun et al., "Wave Fields in Three Dimensions: Analysis and Synthesis", Journal of the Optical Society of America, vol. 13, No. 9, pp. 1837-1848, Sep. 1996.
Post et al., "Moire Methods for Engineering and Science—Moire Interferometry and Shadow Moire", Photomechanics (Topics in Applied Physics), vol. 77, pp. 151-196, Springer Berlin / Heidelberg, Jan. 1, 2000.
Chinese Patent Application # 200780006560.6 Official Action dated Oct. 11, 2010.
International Application PCT/IB2010/053430 Search Report dated Dec. 28, 2010.
Scharstein et al., "High-Accuracy Stereo Depth Maps Using Structured Light", IEEE Proceedings of the Conference on Computer Vision and Pattern Recognition, pp. 165-171, Jun. 18, 2003.
Koschan et al., "Dense Depth Maps by Active Color Illumination and Image Pyramids", Advances in Computer Vision, pp. 137-148, Springer 1997.
Marcia et al., "Fast Disambiguation of Superimposed Images for Increased Field of View", IEEE International Conference on Image Processing, San Diego, USA, Oct. 12-15, 2008.
Microvision Inc., "Micro-Electro-Mechanical System (MEMS) Scanning Mirror", years 1996-2009.
U.S. Appl. No. 61/419,891 "Lens Arrays for Pattern Projection and Imaging" filed Dec. 6, 2010.
U.S. Appl. No. 61/415,352 "Depth mapping using time-coded illumination" filed Nov. 19, 2010.
Lavoie et al., "3-D Object Model Recovery From 2-D Images Using Structured Light", IEEE Transactions on Instrumentation and Measurement, vol. 53, No. 2, pp. 437-443, Apr. 2004.
Chinese Application # 200780016625.5 Office Action dated May 12, 2011.
U.S. Appl. No. 11/899,542 Office Action dated Apr. 4, 2011.
U.S. Appl. No. 11/724,068 Office Action dated Mar. 1, 2011.

(56) References Cited

OTHER PUBLICATIONS

Chinese Application # 200780009053.8 Office Action dated Mar. 10, 2011.
Japanese Application # 2008535179 Office Action dated Apr. 1, 2011.
Kun et al., "Gaussian Laser Beam Spatial Distribution Measurement by Speckles Displacement Method", HICH Power Laser and Particle Beams, vol. 12, No. 2, Apr. 2000.
Chinese Patent Application # 200680038004.2 Official Action dated Dec. 24, 2010.
Chinese Patent Application # 200780016625.5 Official Action dated Oct. 26, 2010.
Chinese Patent Application # 200780006560.6 Official Action dated Feb. 1, 2011.
Yao Kun et al., "Measurement of Space Distribution of Laser Gaussian Beam by Speckles Displacement Method", High Power Laser and Particle Beams, vol. 12, No. 2, pp. 141-144, Apr. 30, 2000.
Japanese Patent Application # 2011-517308 Office Action dated Jun. 19, 2013.
U.S. Appl. No. 13/036,023 Office Action dated Jul. 17, 2013.
U.S. Appl. No. 12/707,678 Office Action dated Jun. 20, 2013.
International Application PCT/IB2013/051189 Search Report dated Jun. 18, 2013.
U.S. Appl. No. 13/036,023 Office Action dated Sep. 3, 2013.
U.S. Appl. No. 13/748,617 Office Action dated Dec. 24, 2014.

* cited by examiner

ERROR COMPENSATION IN THREE-DIMENSIONAL MAPPING

CROSS-REFERENCE TO RELATED APPLICATIONS

This application is a continuation-in-part of U.S. patent application Ser. No. 12/605,340, filed Oct. 25, 2009, and of U.S. patent application Ser. No. 12/282,517, filed Oct. 30, 2008, which claims the benefit of U.S. Provisional Patent Application 60/785,187, filed Mar. 24, 2006, and which is a continuation-in-part of PCT Patent Application PCT/IL2006/000335, filed Mar. 14, 2006, claiming the benefit of U.S. Provisional Patent Application 60/724,903, filed Oct. 11, 2005. The disclosures of all of these related applications are incorporated herein by reference.

FIELD OF THE INVENTION

The present invention relates generally to three-dimensional (3D) optical mapping of objects, and specifically to compensating for errors in the mapping.

BACKGROUND OF THE INVENTION

Various methods are known in the art for generating a 3D profile of an object by processing an optical image of the object.

Some methods are based on projecting a laser speckle pattern onto the object, and then analyzing an image of the pattern on the object. For example, PCT International Publication WO 2007/043036, whose disclosure is incorporated herein by reference, describes a system and method for object reconstruction in which a coherent light source and a generator of a random speckle pattern projects onto the object a coherent random speckle pattern. An imaging unit detects the light response of the illuminated region and generates image data. Shifts of the pattern in the image of the object relative to a reference image of the pattern are used in real-time reconstruction of a 3D map of the object.

As another example, PCT International Publication WO 2007/105215, whose disclosure is incorporated herein by reference, describes a method for mapping in which a pattern of multiple spots is projected onto an object. The positions of the spots in the pattern are uncorrelated, but the shapes of the spots share a common characteristic. In some embodiments, the spot shape characteristic changes with distance from the illumination source. An image of the spots on the object is captured and processed so as to derive a 3D map of the object.

The description above is presented as a general overview of related art in this field and should not be construed as an admission that any of the information it contains constitutes prior art against the present patent application.

SUMMARY OF THE INVENTION

There is provided, according to an embodiment of the present invention, a method for forming a three-dimensional (3D) map of an object, including:

illuminating the object from a light source so as to project a pattern onto the object, capturing an image of the pattern on the object using an array of detector elements, and processing the captured image so as to measure respective offsets of elements of the pattern in the captured image relative to a reference pattern, the offsets including at least a first offset of a first element of the pattern and a second offset of a second element of the pattern, measured respectively in first and second, mutually-perpendicular directions in a plane of the array.

The method also includes computing a geometrical correction factor in response to the first offset, applying the geometrical correction factor to the second offset so as to find a corrected offset, and computing depth coordinates of the object in response to the corrected offset.

Typically the at least first offset of the first element includes a plurality of first offsets of respective first elements, and computing the geometrical correction factor includes fitting the plurality of first offsets to an equation so as to determine constants of the equation. The equation may include a two-dimensional linear equation or a two-dimensional quadratic equation. The method may include using the equation to predict a subsequent value of the first offset.

In one embodiment, the corrected offset includes a corrected second offset, and applying the geometrical correction factor includes using at least one of the constants to find the corrected second offset.

A disclosed embodiment includes correcting at least one of the offsets for distortion in the image. Typically, correcting for the distortion includes capturing a reference image of the pattern, storing parameters of the reference image in a look-up table, and using the look-up table to correct the at least one of the offsets.

An alternative embodiment includes correcting the at least first offset for a geometrical misalignment between the light source and the array of detectors. Typically, correcting for the geometrical misalignment includes using a captured reference image to determine the misalignment. Correcting the at least first offset for the geometrical misalignment may include correcting for a change in the geometrical misalignment.

In a further alternative embodiment the first offsets include a deviation in response to a change of wavelength of the light source, and the geometrical correction factor is configured to correct for the change of wavelength.

The first offsets may include a deviation in response to a change of focal length in optics forming the image, and the geometrical correction factor may be configured to correct for the change of focal length. The method may include measuring a temperature of the optics, and determining the change in focal length in response to the temperature.

A line defined by the light source and the array may be parallel to one of the mutually-perpendicular directions.

The pattern may include primary speckles. Alternatively, the pattern may include a regular geometric pattern.

There is further provided, according to an embodiment of the present invention, apparatus for forming a three-dimensional (3D) map of an object, including:

a light source configured to illuminate the object so as to project a pattern onto the object;

an array of detector elements configured to capture an image of the pattern on the object; and a processor which is configured to:

process the captured image so as to measure respective offsets of elements of the pattern in the captured image relative to a reference pattern, the offsets including at least a first offset of a first element of the pattern and a second offset of a second element of the pattern, measured respectively in first and second, mutually-perpendicular directions in a plane of the array, compute a geometrical correction factor in response to the first offset;

apply the geometrical correction factor to the second offset so as to find a corrected offset; and compute depth coordinates of the object in response to the corrected offset.

The present invention will be more fully understood from the following detailed description of the embodiments thereof, taken together with the drawings. A brief description of the drawings follows.

DETAILED DESCRIPTION OF EMBODIMENTS

Figure 1:
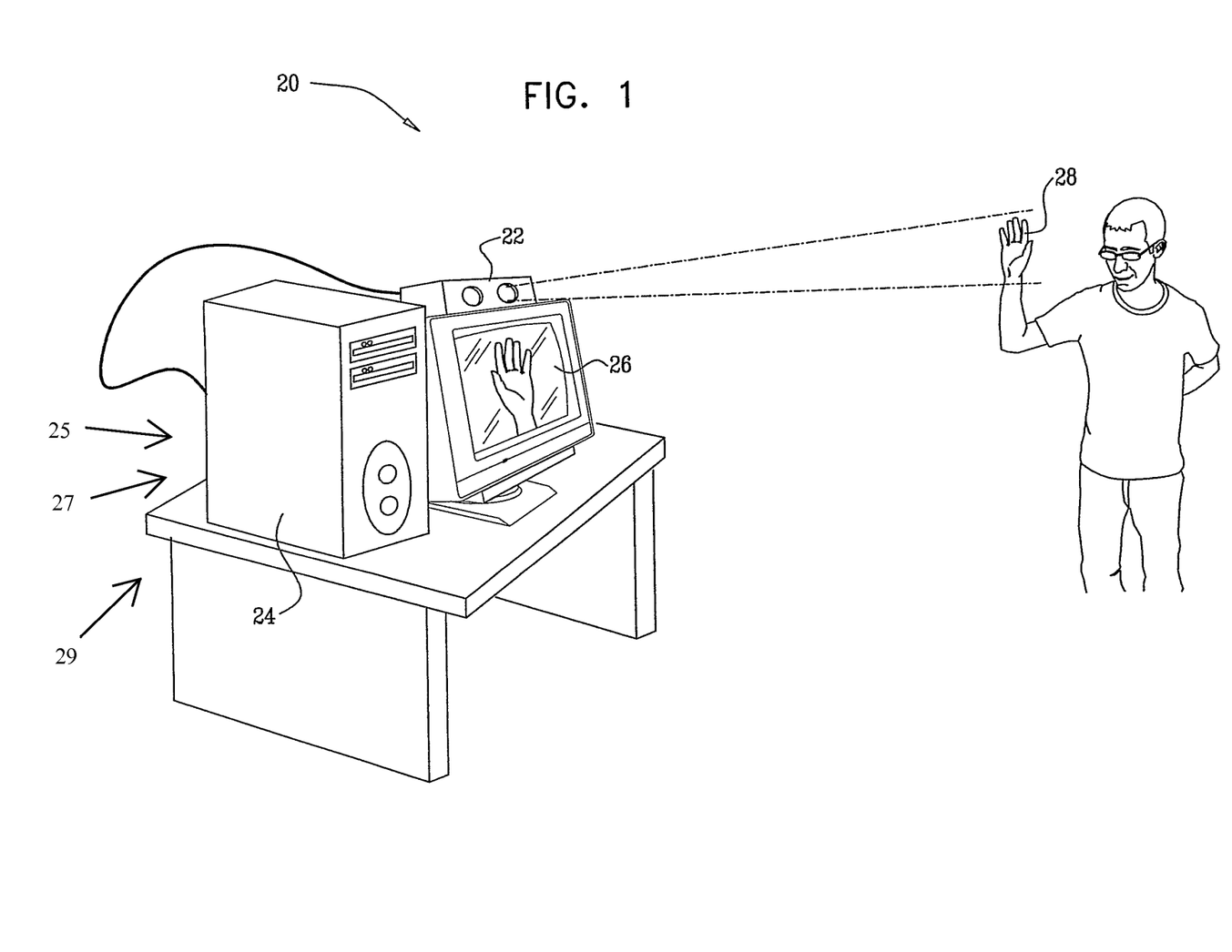
FIG. 1 is a schematic, pictorial illustration of a system for three-dimensional (3D) mapping, according to an embodiment of the present invention.

FIG. 1 is a schematic, pictorial illustration of a system 20 for three-dimensional (3D) mapping, according to an embodiment of the present invention. System 20 comprises an imaging device 22, which generates and projects a spot pattern onto an object 28 and captures an image of the pattern appearing on the object. The radiation generating the spot patent may comprise coherent or non-coherent radiation. Details of the design and operation of device 22 are shown in the figures that follow and are described hereinbelow with reference thereto.

The spot pattern projected by device 22 may be generated as a regular, non-random geometric pattern, such as the type of pattern that may be created by passing the illumination beam through a Damman grating or a suitable lenslet or micro lens array. The spot pattern may alternatively be generated as a pseudo-random or quasi-random pattern, such as is created by human or computer design. Further alternatively, the spot pattern may be a substantially random pattern, such as that created by primary laser speckle. The primary speckle is caused by interference among different components of a diffused beam. The term "primary speckle" is used in this sense in the present patent application and in the claims, in distinction to secondary speckle, which is caused by diffuse reflection of coherent light from the rough surface of an object Examples of different systems for generating spot patterns are described in the PCT Patent Application WO2007/105215 referenced above, as well as in US Patent Application 2009/0185274 and PCT Patent Application WO 2007/105205, both of which are assigned to the assignee of the present invention, and which are incorporated herein by reference.

While the spot pattern projected by device 22 may comprise any of the types described above, or combinations of such types, for simplicity, in the following description the spot pattern is assumed to be created by primary speckle. Those having ordinary skill in the art will be able to modify the description, mutatis mutandis, to encompass spot patterns generated by systems other than primary speckle.

An image processor 24 processes image data generated by device 22 in order to derive a 3D map of object 28. The term "3D map," as used in the present patent application and in the claims, refers to a set of 3D coordinates representing the surface of an object. The derivation of such a map based on image data may also be referred to as "3D reconstruction." Image processor 24, which performs such reconstruction, may comprise a general-purpose computer processor, which is programmed in software. The software is typically stored in a memory 25 associated with the image processor, and is used by the processor to carry out the functions described hereinbelow. Memory 25 may also store look-up tables 27 and 29, described in more detail below.

The software may be downloaded to processor 24 in electronic form, over a network, for example, or it may alternatively be provided on tangible media, such as optical, magnetic, or electronic memory media. Alternatively or additionally, some or all of the functions of the image processor may be implemented in dedicated hardware, such as a custom or semi-custom integrated circuit or a programmable digital signal processor (DSP). Although processor 24 is shown in FIG. 1, by way of example, as a separate unit from imaging device 22, some or all of the processing functions of processor 24 may be performed by suitable dedicated circuitry within the housing of the imaging device or otherwise associated with the imaging device.

The 3D map that is generated by processor 24 may be used for a wide range of different purposes. For example, the map may be sent to an output device, such as a display 26, which shows a pseudo-3D image of the object. In the example shown in FIG. 1, object 28 comprises all or a part (such as a hand) of the body of a subject. Alternatively, system 20 may be used to create 3D maps of objects of other types, for substantially any application in which 3D coordinate profiles are needed.

Figure 2:
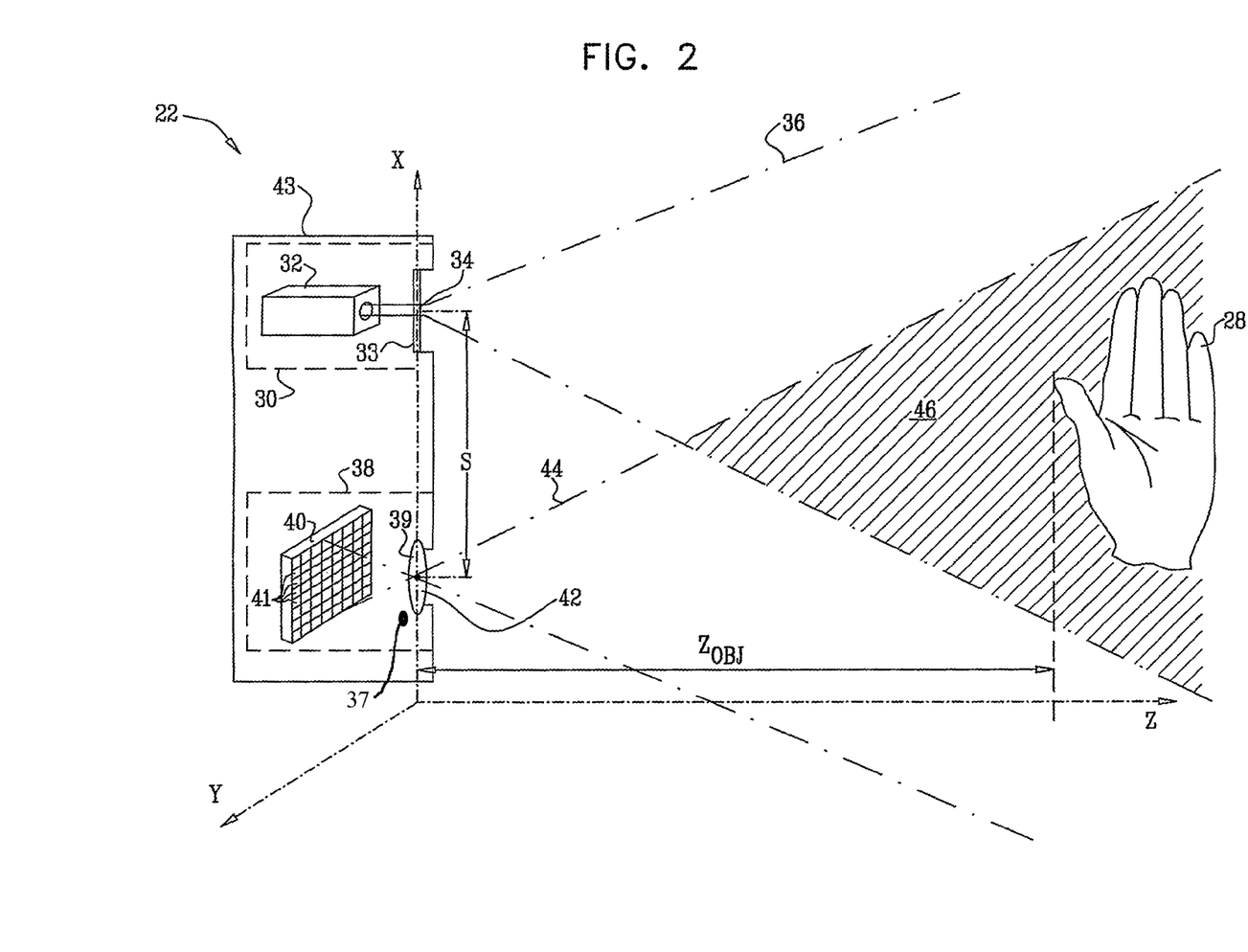
FIG. 2 is a schematic top view of a device in the system of FIG. 1, according to an embodiment of the present invention.

FIG. 2 is a schematic top view of device 22, according to an embodiment of the present invention. An illumination assembly 30 comprises a coherent light source 32, typically a laser, and a diffuser 33. (The term "light" in the context of the present patent application refers to any sort of optical radiation, including infrared and ultraviolet, as well as visible light.) The beam of light emitted by source 32 passes through diffuser 33 at a spot 34, and thus generates a diverging beam 36, within which are primary speckle patterns. The primary speckle patterns created by diffuser 34 at object 28 are a function, inter alia, of a distance $Z_{OBJ}$ between the diffuser and the object.

An image capture assembly 38 captures an image of the speckle pattern that is projected onto object 28. Assembly 38 comprises objective optics 39, which focus the image onto an image sensor 40, assumed to be a distance p from the objective optics. In some embodiments, assembly 38 comprises a temperature sensor 37 which is configured to provide an indication of the temperature of optics 39 to processor 24. Temperature sensor 37 may comprise any device known in the art, such as a thermistor, from which the processor is able to determine the temperature of the optics. Typically, sensor 40 comprises a rectilinear array of detector elements 41, such as a CCD or CMOS-based image sensor array. Optics 39 have an entrance pupil 42, which together with the dimensions of the image sensor defines a field of view 44 of the image capture assembly. A sensing volume of device 22 comprises an overlap volume 46 between beam 36 and field of view 44. Typically, the field of view of the image capture assembly is enclosed by beam 36.

Illumination assembly 30 and image capture assembly 38 are held in a fixed spatial relation by a mount 43, so that the centers of pupil 42 and spot 34 are separated by a distance S. In the embodiment shown in FIG. 2, the mount comprises a housing that holds the assemblies. Alternatively, any other suitable sort of mechanical mount may be used to maintain the desired spatial relation between the illumination and image capture assemblies. The configuration of device 22 and the processing techniques described hereinbelow make it possible to perform 3D mapping using the single image capture assembly, without relative movement between the illumination and image capture assemblies and without moving parts. Image capture assembly 38 thus captures images at a single, fixed angle relative to illumination assembly 30.

To simplify the computation of the 3D map it is desirable that mount 43 hold assemblies 30 and 38 so that the axis passing through the centers of entrance pupil 42 and spot 34 is parallel to one of the axes of sensor 40. In other words, taking the rows and columns of the array of detector elements 41 to define mutually-perpendicular X- and Y-axes (with the origin on the optical axis of objective optics 39), the axis passing through the centers of pupil 42 and spot 34 should be parallel to one of the array axes, which is taken for convenience to be the X-axis. A Z-axis is assumed to be mutually perpendicular to, and has a common origin with, the X- and Y-axes.

The description below assumes that, by way of example, one of the axes of device 40 aligns with the axis between the centers of pupil 42 and spot 34. However, it will be appreciated that such alignment is to simplify computation, and is not a requirement of embodiments of the present invention.

Figure 3:
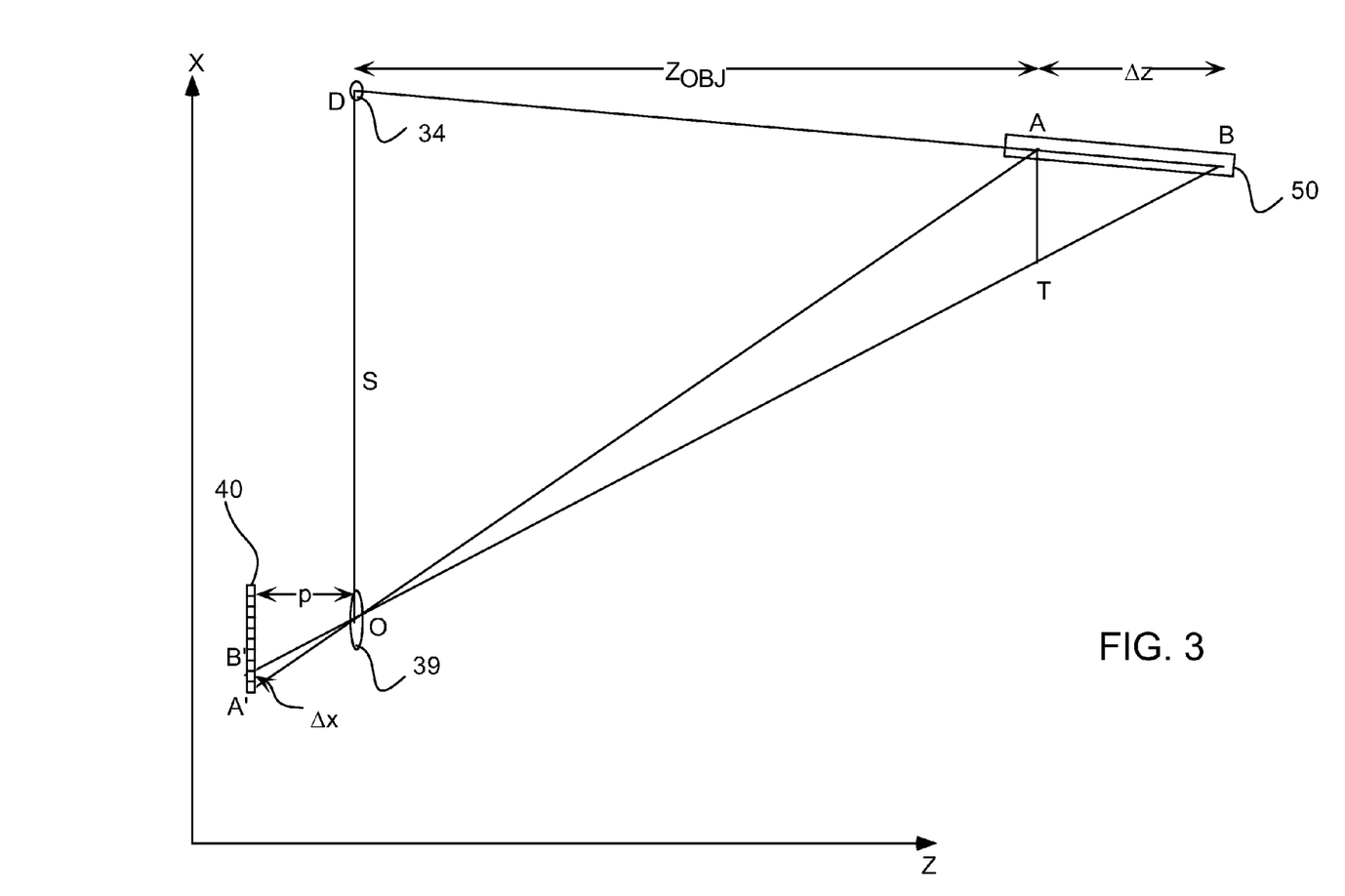
FIG. 3 is a schematic cross-sectional diagram of the device, illustrating the formation of an image on a sensor, according to an embodiment of the present invention.

FIG. 3 is a schematic cross-sectional diagram of device 22 illustrating the formation of an image on sensor 40, according to an embodiment of the present invention. The diagram is assumed to be drawn in the XZ plane of device 22. As stated above, diffuser 33 generates a primary speckle pattern. A single exemplary speckle 50, generated by light originating from spot 34, is shown in the figure. Speckle 50 may be approximated as a narrow tube, and for simplicity speckle 50 is assumed to align with spot 34. Object 28 is initially at a point A, distant $Z_{OBJ}$ from spot 34, on speckle 50, and optics 39 form an image A', of point A, on array 40. It will be understood that a magnification, m, of optics 39 is given by:

$$m = \frac{p}{Z_{OBJ}} \qquad (1)$$

If object 28 moves to a point B, distance Δz (measured with respect to the Z-axis) from point A, point B forms an image B' on array 40. The distance A'B' is a transverse offset parallel to the X-axis, and A'B' is also herein termed Δx.

For clarity, in FIG. 3 the centers of spot 34 and pupil 42 are respectively labeled D and O. In addition, a construction line AT, parallel to line DO, is drawn.

Triangles A'B'O and ATO are similar; also triangles BAT and BDO are similar. From properties of these sets of similar triangles, an equation relating Δx and Δz is:

$$\Delta z = \frac{\Delta x \cdot (Z_{OBJ} + \Delta z)}{m \cdot S} \qquad (2)$$

(Expression (2) applies for objects regardless of their position relative to the Z-axis.)

Consideration of equation (2) shows that Z-coordinates of points on an object, as well as shifts in the Z-coordinates over time, may be determined by measuring offsets or shifts in the X-coordinates of the speckle images captured by assembly 38 relative to a reference image taken at a known distance Z. In other words, a group of speckle images in each area of the captured image may be compared to the reference image to find the most closely-matching group of speckle images in the reference image. The relative shift between the matching groups of speckle images gives the Z-direction shift of the corresponding area of the imaged object.

Consideration of equation (2) also shows that in the arrangement shown in FIG. 2, in which the X-axis passing through the centers of pupil 42 and spot 34 is parallel to the X-axis of sensor 40, the shift or offset of the imaged speckle pattern with an object shift of Δz is theoretically strictly in the X-direction, with no Y-component of the offset.

As explained below, embodiments of the present invention determine actual Y-component offsets (Δy) of the speckle images, by a process including prediction of the offsets using previous offsets that have been fitted to a parametric equation. The Y-component offsets are caused by deviations of device 22 from the theoretical state assumed in the derivation of equation (2). The values of Δy that are determined are used to correct measured values of Δx, since these measured values include errors caused by the deviations from theoretical of device 22. Such deviations may or may not vary over time. Some of the deviations from the theoretical state are described below in more detail.

Figures 4A, 4B:
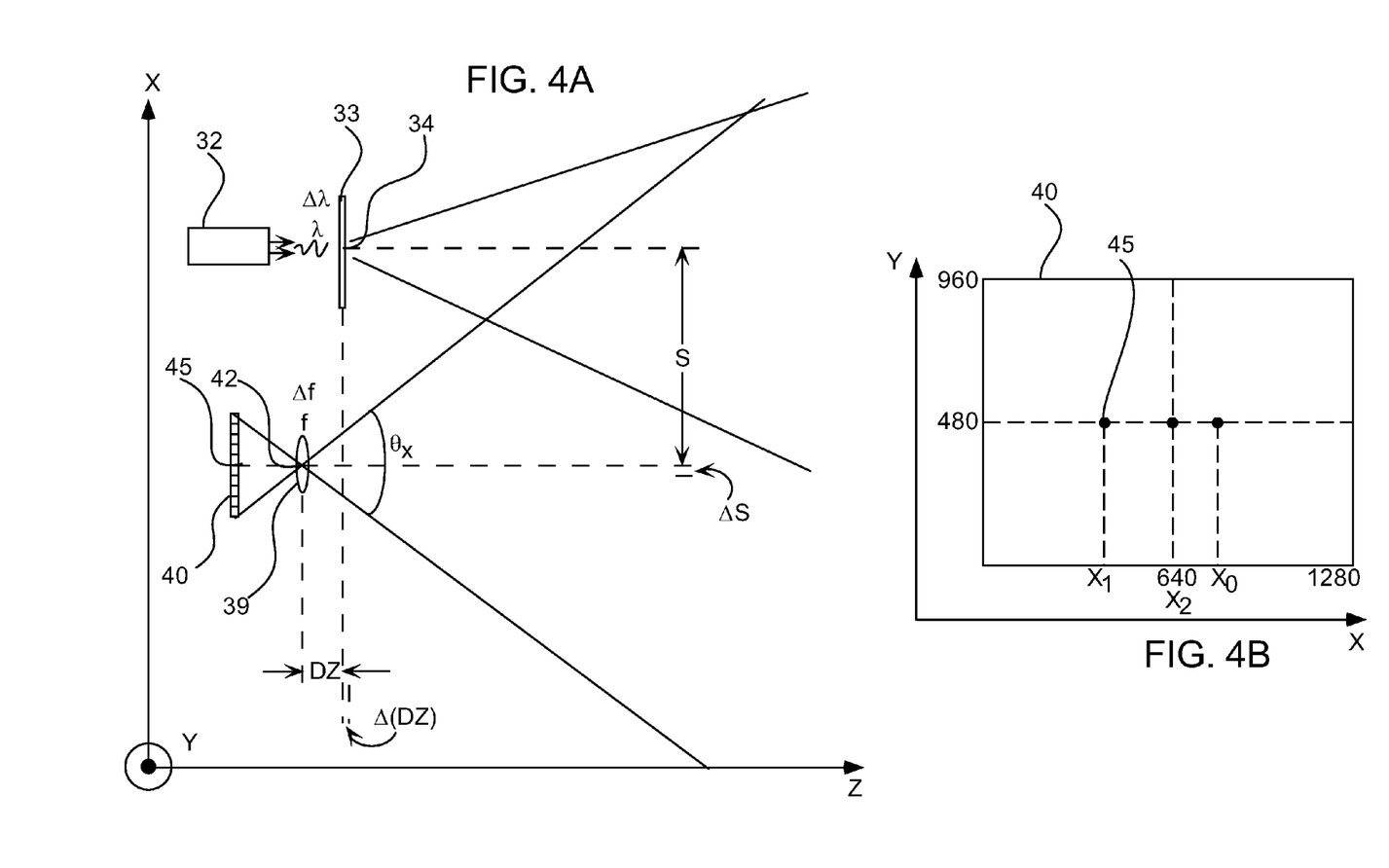
FIG. 4A is a schematic diagram illustrating deviations from its theoretical state of the device.
FIG. 4B illustrates an element of the device, according to an embodiment of the present invention.

FIG. 4A is a schematic diagram illustrating deviations from its theoretical state of device 22, and FIG. 4B illustrates array 40, according to an embodiment of the present invention. In the following description, by way of example, sensor 40 is assumed to be a rectangular array of 1280×960 pixels, with the 1280 pixels parallel to the X-direction. The deviations explained herein are corrected by a process, described with reference to FIG. 6 below, followed by processor 24.

A first deviation occurs when the centers of pupil 42 and spot 34 do not lie in a common XY plane, but are separated by a non-zero distance DZ. As explained below, with reference to the flowchart of FIG. 6, such separation may be allowed for in an initial calibration of device 22, for example, by using reference spots projected onto a surface. However, the calibration is only exact for object Z positions corresponding to the Z values of the reference positions used for the calibration. Other object distances cause a Y-component offset, Δy, which is a function of the actual Y value, Y, and the actual Δx offset, $\Delta x_{real}$, as measured on sensor 40. An expression for Δy is:

$$\Delta y = DZ \operatorname{Coeff} \cdot (Y - Y_{center}) \cdot \Delta x_{real} \qquad (3a)$$

where $Y_{center}$ is the value of the central Y row of sensor 40, herein assumed to be 480, and DZCoeff is a function given by equation (3b):

$$DZCoeff = \frac{DZ \cdot \tan\left(\frac{\theta_y}{2}\right)}{S \cdot \frac{Res_Y}{2}} \qquad (3b)$$

where $\theta_y$ is the field of view in the Y-direction of sensor 40; and $Res_Y$ is the number of rows of the sensor in the Y-direction.

A second deviation is due to optics 39 not behaving as an ideal lens, so that distortions, such as barrel or pincushion distortions, affect the image produced on sensor 40. Such distortions typically involve a change of magnification of optics 39 as the distance from the center of the sensor changes, and the distortions are centrally symmetric. An embodiment of the present invention corrects distortions of optics 39, by using images of reference spots that are in known positions and/or formed using a reference object having a known shape. Alternatively, distortions are corrected by using a lens distortion equation known in the art. The coefficients for the lens distortion equation may be determined by a calibration process, and/or by using parameters of optics 39 that are typically provided by a producer of the optics. Further alternatively, distortions may be corrected using other known geometrical correction factors associated with system 20.

A third deviation comprises physical changes in alignment between illumination assembly 30 and image capture assembly 38, as well as errors caused during assembly of system 20. As described above with reference to the first deviation, centers of pupil 42 and spot 34 are separated in the Z-direction by a distance DZ.

As is also described above, centers of pupil 42 and spot 34 are initially separated in the X-direction by a distance S.

Both DZ and S may vary respectively by $\Delta(DZ)$ and $\Delta S$ from their initial values. The variation is typically because of temperature changes in device 22. The variation leads to a corresponding change in $\Delta x_{real}$. Assuming a field of view of $\theta_x$ in the X-direction, a corrected offset value of $\Delta x$, $\Delta x_{nominal}$, is given by:

$$\Delta x_{nominal} \approx \qquad (4)$$

$$\Delta x_{real} \cdot \left(1 - \frac{\Delta S + (DZ + \Delta(DZ)) \cdot \tan(\theta_x/2) \cdot \frac{x_{real}^{image} - X_{center}}{image\_width}}{S}\right)$$

where $x_{real}^{image}$ is the column number of sensor 40;

$X_{center}$ is the value of the central X column of sensor 40, herein assumed to be 640, and image-width is half the number of columns of the sensor. The expression $$\left(\Delta S + (DZ + \Delta(DZ)) \cdot \tan(\theta_x/2) \cdot \frac{x_{real}^{image} - X_{center}}{image\_width}\right)$$

is also referred to below as $E_{error}$.

A fourth deviation is caused by expansion or contraction of the spot pattern projected by illumination assembly 30. Typically, such as if a Damman grating is used, or if the spot pattern comprises speckles, the expansion or contraction of the spot pattern is caused by a wavelength change $\Delta\lambda$ of source 32. The wavelength typically changes according to corresponding changes in temperature of source 32.

To a good approximation, the effect on $\Delta x$ caused by the expansion or contraction of the spot pattern may be considered to be a linear expansion factor $\alpha$ measured about a value of an x column, $x_0$, of sensor 40. In this case, corrected offset $\Delta x_{nominal}$ is given by:

$$\Delta x_{nominal} = \Delta x_{real}(1+\alpha) + \alpha(x_{real}^{image} - x_0) \qquad (5)$$

A fifth deviation is caused by the change in focal length $\Delta f$ of optics 39 in image capture assembly 39. Typically, the changes in focal length are also, as for the fourth deviation, caused by changes in temperature of device 22. The change in focal length leads to an overall change in magnification m of optics 39 (equation (1)), causing an expansion or contraction of the image about a point 45 on array 40. Point 45 is the intersection of the optic axis of lens 39 with array 40, and is assumed to have an x column values of $x_1$. In this case, $\Delta x_{nominal}$ is given by:

$$\Delta x_{nominal} = \Delta x_{real} - \beta(x_{real}^{image} - x_1) \qquad (6)$$

where $\beta$ is a change in magnification m.

Equations (4), (5), and (6) may be combined into a single equation for corrected offset $\Delta x_{nominal}$, giving a resultant equation encompassing the third, fourth, and fifth deviations described above:

$$\Delta x_{nominal} = (\Delta x_{real}(1+\alpha) + \alpha(x_{real}^{image} - x_0) - \beta(x_{real}^{image} - x_1))\left(1 - \frac{E_{error}}{S}\right) \qquad (7)$$

As is described below, equation (7) is used by processor 24 (FIG. 1) to determine corrected values of $\Delta x_{real}$.

Figure 5:
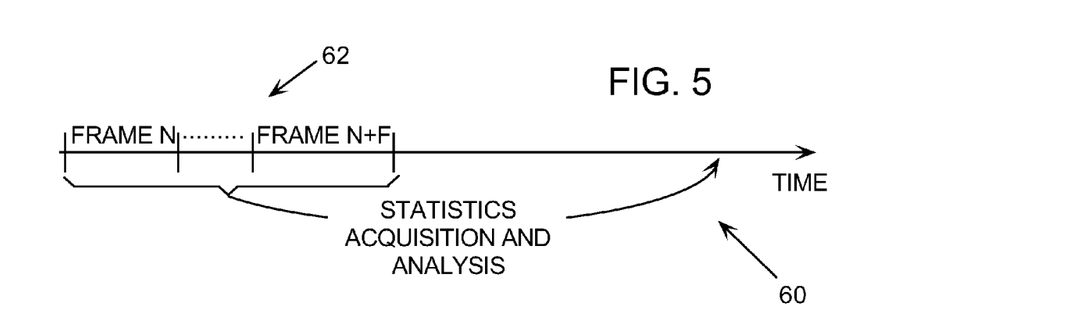
FIG. 5 is a schematic time line illustrating operation of the device, according to an embodiment of the present invention.
Figure 6:
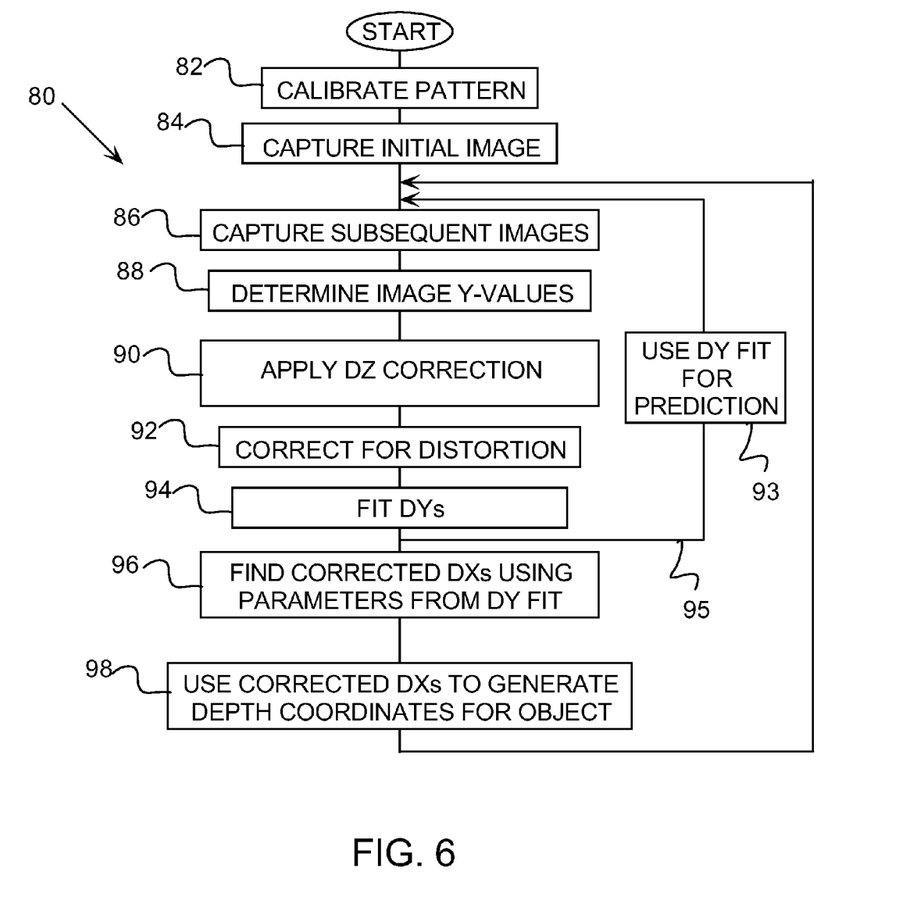
FIG. 6 is a flowchart schematically illustrating steps in the operation, according to an embodiment of the present invention.

FIG. 5 is a schematic time line 60 illustrating operation of device 22, and FIG. 6 is a flowchart 80 schematically illustrating steps in the operation, according to an embodiment of the present invention.

Before mapping an object (and before the regions illustrated in time line 60), device 22 is calibrated by projecting the speckle pattern from assembly 30 onto an object of known spatial profile at a known distance from the device, at a calibration step 82. Typically, a planar object extending across volume 46 at a known distance $Z_{OBJ}$ is used as a calibration target for this purpose. Image capture assembly 38 captures a reference image of the object, which is stored in memory 25 of processor 24. This calibration step may be carried out at the time of manufacture, and the reference image stored in the memory will then be usable in the field.

In calibration step 82, coordinates of images of selected speckles are stored as look-up table 27 in memory 25. The selected speckles are typically distributed relatively uniformly within the field of view of sensor 40 (although some of the speckles projected by source 32 typically lie outside the field of view of the sensor), and at different distances from the center of the sensor. The stored coordinates may be used by processor 24 in correcting the lens distortions referred to above, in a distortion correction step 92 of the flowchart.

Also in calibration step 82, the values of parameters DZCoeff, $x_0$, and $x_1$, described above, may be evaluated and stored in memory 25. Alternatively, $x_0$ and/or $x_1$ may be assumed to be at a specific position in the sensor, for instance, at its center.

In calibration step 82, there is no need to evaluate values of dY for the stored images, or to store such evaluated values in memory 25. Effectively, dY may be evaluated from an equation (9), described below. Consequently, the process described by flowchart 80 saves considerable memory as well as computing time.

In embodiments comprising temperature sensor 37 (FIG. 2) processor 24 may determine a calibration temperature $T_{cal}$ using the temperature sensor in calibration step 82.

When system 20 is ready for use, it is actuated to capture an initial image of the object of interest (object 28 in this example) using device 22, at an image capture step 84. Capture step 84 corresponds to the beginning of a statistic acquisition time period 62 of the time line, at which time a frame N begins to be captured.

Processor 24 compares the captured image to the speckle pattern in the stored calibration image. Processor 24 selects a certain window within a non-shadow part of the image, and compares the sub-image within the window to parts of the reference image until the part of the reference image that best matches the sub-image is found. Processor 24 may use the map coordinates of this first window as a start point for determining the coordinates of neighboring areas of the image. Specifically, once the processor has found a high correlation between a certain area in the image and a corresponding area in the reference image, the offset of this area relative to the reference image can serve as a good predictor of the offsets of neighboring pixels in the image. The processor attempts to match these neighboring pixels to the reference image with an offset equal to or within a small range of the initially-matched area. In this manner, the processor "grows" the region of the matched area until it reaches the edges of the window. The processor stores the coordinates of the matched pixels in memory 25.

The process of matching pixels, using X and Y offsets determined from a previous image as predictors for a subsequent image, as well as the process of growing, is continued in a subsequent image capture step 86. In addition, as shown in the flowchart by a loop 95, and as described in more detail below, the processor is able to use a fitted equation to predict the Y offset.

In a first analysis step 88, processor 24 determines the Y-values of the stored pixels. For simplicity, except where otherwise stated, the following description describes how the processor corrects for the image of one spot. Typically, the processor applies the corrections to the coordinates of all spots that are stored in the memory.

In a DZ correction step 90, using the Y-value determined in step 88, herein termed $Y_{initial}$, processor 24 corrects for deviations caused by the centers of pupil 42 and spot 34 not lying in a common XY plane. To implement the correction, the processor retrieves the value of DZCoeff from memory 25, and applies equation (3a) to $Y_{initial}$, generating a first corrected value of the Y-coordinate: $(Y_{initial}+\Delta y)$.

In a distortion correction step 92, the first corrected value of Y, $(Y_{initial}+\Delta y)$ is further corrected for lens distortion (corresponding to the second deviation described above). In one embodiment, processor 24 determines a distance of the spot from the center of sensor 40, and corrects for lens distortion by using look-up table 27, typically by applying linear interpolation to the values stored in the table. Alternatively or additionally, distortion may be corrected using the lens distortion equation referred to above. Typically, the distortion given by such an equation is a function of the radial distance from the intersection of the lens optic axis with the sensor, and may be applied using look-up table 29 stored in memory 25. Look-up table 29 may be generated from coefficients derived in calibration step 82, or from documentation associated with optics 39. The distortion correction gives a corrected value of $(Y_{initial}+\Delta y)$, herein termed $Y_{corrected}$.

Using a reference value of Y, $Y_{ref}$, for the spot that is also corrected for lens distortion in a similar manner to that described above, processor 24 then determines a corrected offset, DY, of the Y-offset:

$$DY = Y_{ref} - Y_{corrected} \qquad (8)$$

The processor stores the values of DY, together with the respective coordinates (X,Y) of the spot of DY. DY is a function of (X,Y) and is also herein written as DY(X,Y).

Typically, in order to generate good results for a following equation fitting step 94, between 500 and 1500 values of DY(X,Y) are stored. Depending on the capability of processor 24, such storage may be achieved for each frame captured.

Alternatively, for processors which are not able to store a sufficient number of values each frame, a smaller number of values may be stored from each frame. A number F (FIG. 5) of frames may be processed until a desired number of DY values for fitting step 94 is achieved. Such a process saves considerable computation time, enabling the fitting to be done in real-time, without significantly affecting the results. In one embodiment, only one out of every 49 values are stored per frame, and the diluted number of stored values are accumulated over F=75 frames.

In equation fitting step 94, the processor fits the stored values of DY to a predetermined function of X and Y. In one embodiment, the function by way of example is linear in X and Y, and has a form:

$$DY(X,Y) = A(X-X_C) + BY + C \qquad (9)$$

where

A is a factor describing a rotation about the Z-axis,

B is a factor describing an expansion or contraction along the Y-axis,

C is a constant Y-offset factor that is typically caused by mechanical shifts from the initial assembly of system 20, and $X_C$ is the central X value of sensor 40.

As shown by a loop 95, processor 24 uses the values of B, and C to predict, in a DY prediction step 93, values for DY. The processor uses the predicted values of DY from step 93 in image capture step 86. It will be understood that the predicted values of DY, determined by fitting to a predetermined function such as is exemplified by equation (9), typically encompass and substantially correct for all Y offsets generated by the non-theoretical state of device 22.

The term B for equation (9) is a combination of the factors α and β used in equations (5), (6), and (7) above, and is used as a geometrical correction factor, as described below, for $\Delta x_{real}$. (The terms B and C act as geometrical correction factors for DY, and have been used in step 93.)

In a dX correction step 96, processor 24 applies the value of B, determined by fitting DY values in step 94, to correct the measured value of $\Delta x_{real}$ for all spot coordinates stored in memory 25. The processor performs the correction using equation (7) above, in order to find a corrected offset value $\Delta x_{nominal}$ for each spot.

In a disclosed embodiment, α is assumed to be 0, and B is substituted for β in equation (7). In this disclosed embodiment, the effects caused by expansion or contraction of the spot pattern (equation (5)) are assumed negligible.

In embodiments comprising temperature sensor 37, processor 24 may determine a temperature T of optics 39 using the temperature sensor. In this case, since β is a function of T, the processor may use the value of T and the value of B determined in step 94 to estimate values for α and β, for substitution into equation (7). It will be understood that if T is substantially the same as calibration temperature $T_{cal}$ (measured in calibration step 82), β may be assumed to be 0, and B may be substituted for α in equation (7).

In a mapping step 98, the processor uses the corrected offset values, $\Delta x_{nominal}$, of the spots to perform a 3D reconstruction by generating Z values, i.e., depth coordinates, for the object being imaged, using equation (2). The processor then uses the generated depth coordinates to derive a 3D map of the object being imaged.

Typically, processor 24 performs steps 86-98 during real-time operation of device 22, and reiterates the steps while the device is functioning. Consequently, the processor is able to generate corrected values of Z for the object being imaged in real-time, and on a continuing basis, and to provide the corrected values to subsequent frames, as illustrated in time line 60.

While the description above has referred to specific types of deviations of device 22 from its theoretical state, it will be understood that the fitting performed in equation fitting step 94 typically corrects other deviations of device 22, at least to a first approximation.

Furthermore, while fitting to the linear function exemplified in equation (9) allows for simplified, and consequently speedy and low-cost, computation, it will be understood that other types of functions may be used to fit values of DY. For example, in some embodiments DY may be fitted to a second degree polynomial in X and Y, so that the processor finds 6 factors, rather than the three factors of equation (9). Those having ordinary skill in the art will appreciate that the extra factors may be applied to correct for other deviations from theoretical of device 22, such as tilt of sensor 40 with respect to an XY plane.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

We claim:

1. A method for forming a three-dimensional (3D) map of an object, comprising:
   illuminating the object from a light source so as to project a pattern onto the object;
   capturing an image of the pattern on the object using an array of detector elements;
   processing the captured image so as to measure respective offsets of elements of the pattern in the captured image relative to a reference pattern, the offsets comprising at least a first offset of a first element of the pattern and a second offset of a second element of the pattern, measured respectively in first and second, mutually-perpendicular directions in a plane of the array;
   computing a geometrical correction factor in response to the first offset;
   applying the geometrical correction factor to the second offset so as to find a corrected offset; and
   computing depth coordinates of the object in response to the corrected offset.

2. The method according to claim 1, wherein the at least first offset of the first element comprises a plurality of first offsets of respective first elements.

3. The method according to claim 2, and wherein computing the geometrical correction factor comprises fitting the plurality of first offsets to an equation so as to determine constants of the equation.

4. The method according to claim 3, wherein the corrected offset comprises a corrected second offset, and wherein applying the geometrical correction factor comprises using at least one of the constants to find the corrected second offset.

5. The method according to claim 3, wherein the equation comprises a two-dimensional linear equation.

6. The method according to claim 3, wherein the equation comprises a two-dimensional quadratic equation.

7. The method according to claim 3, and comprising using the equation to predict a subsequent value of the first offset.

8. The method according to claim 1, and comprising correcting at least one of the offsets for distortion in the image.

9. The method according to claim 8, wherein correcting for the distortion comprises capturing a reference image of the pattern, storing parameters of the reference image in a look-up table, and using the look-up table to correct the at least one of the offsets.

10. The method according to claim 1, and comprising correcting the at least first offset for a geometrical misalignment between the light source and the array of detectors.

11. The method according to claim 10, wherein correcting for the geometrical misalignment comprises using a captured reference image to determine the misalignment.

12. The method according to claim 10, wherein correcting the at least first offset for the geometrical misalignment comprises correcting for a change in the geometrical misalignment.

13. The method according to claim 1, wherein the first offsets comprise a deviation in response to a change of wavelength of the light source, and wherein the geometrical correction factor is configured to correct for the change of wavelength.

14. The method according to claim 1, wherein the first offsets comprise a deviation in response to a change of focal length in optics forming the image, and wherein the geometrical correction factor is configured to correct for the change of focal length.

15. The method according to claim 14, and comprising measuring a temperature of the optics, and determining the change in focal length in response to the temperature.

16. The method according to claim 1, wherein a line defined by the light source and the array is parallel to one of the mutually-perpendicular directions.

17. The method according to claim 1, wherein the pattern comprises primary speckles.

18. The method according to claim 1, wherein the pattern comprises a regular geometric pattern.

19. An apparatus for forming a three-dimensional (3D) map of an object, comprising:
   a light source configured to illuminate the object so as to project a pattern onto the object;
   an array of detector elements configured to capture an image of the pattern on the object; and
   a processor which is configured to:
   process the captured image so as to measure respective offsets of elements of the pattern in the captured image relative to a reference pattern, the offsets comprising at least a first offset of a first element of the pattern and a second offset of a second element of the pattern, measured respectively in first and second, mutually-perpendicular directions in a plane of the array,
   compute a geometrical correction factor in response to the first offset;
   apply the geometrical correction factor to the second offset so as to find a corrected offset; and
   compute depth coordinates of the object in response to the corrected offset.

20. The apparatus according to claim 19, wherein the at least first offset of the first element comprises a plurality of first offsets of respective first elements.

21. The apparatus according to claim 20, wherein computing the geometrical correction factor comprises fitting the plurality of first offsets to an equation so as to determine constants of the equation.

22. The apparatus according to claim 21, wherein the corrected offset comprises a corrected second offset, and wherein applying the geometrical correction factor comprises using at least one of the constants to find the corrected second offset.

23. The apparatus according to claim 21, wherein the equation comprises a two-dimensional linear equation.

24. The apparatus according to claim 21, wherein the equation comprises a two-dimensional quadratic equation.

25. The apparatus according to claim 21, and comprising using the equation to predict a subsequent value of the first offset.

26. The apparatus according to claim 19, wherein the processor is configured to correct at least one of the offsets for distortion in the image.

27. The apparatus according to claim 26, wherein correcting for the distortion comprises capturing a reference image of the pattern, storing parameters of the reference image in a look-up table, and using the look-up table to correct the at least one of the offsets.

28. The apparatus according to claim 19, and comprising correcting the at least first offset for a geometrical misalignment between the light source and the array of detectors.

29. The apparatus according to claim 28, wherein correcting for the geometrical misalignment comprises using a captured reference image to determine the misalignment.

30. The apparatus according to claim 28, wherein correcting the at least first offset for the geometrical misalignment comprises correcting for a change in the geometrical misalignment.

31. The apparatus according to claim 19, wherein the first offsets comprise a deviation in response to a change of wavelength of the light source, and wherein the geometrical correction factor is configured to correct for the change of wavelength.

32. The apparatus according to claim 19, and comprising optics forming the image, and wherein the first offsets comprise a deviation in response to a change of focal length in the optics, and wherein the geometrical correction factor is configured to correct for the change of focal length.

33. The apparatus according to claim 32, and comprising a temperature sensor configured to measure a temperature of the optics, and wherein the processor is configured to determine the change in focal length in response to the temperature.

34. The apparatus according to claim 19, wherein a line defined by the light source and the array is parallel to one of the mutually-perpendicular directions.

35. The apparatus according to claim 19, wherein the pattern comprises primary speckles.

36. The apparatus according to claim 19, wherein the pattern comprises a regular geometric pattern.

* * * * *